US010097663B1

(12) United States Patent
Ferenczi et al.

(10) Patent No.: US 10,097,663 B1
(45) Date of Patent: Oct. 9, 2018

(54) USING INTEGRATED CODE TO EXTRACT DEVICE CHARACTERISTICS FOR ONLINE SECURITY

(71) Applicant: American Express Travel Related Services Company, Inc., New York, NY (US)

(72) Inventors: Andras Ferenczi, Peoria, AZ (US); Vishnu Garg, Phoenix, AZ (US); Vernon Marshall, London (GB); Sulabh Monga, Scottsdale, AZ (US); Timothy Rollins, Cave Creek, AZ (US); Vishnuvajhala Venkata Subrahmanyam, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 4 days.

(21) Appl. No.: 15/601,302

(22) Filed: May 22, 2017

(51) Int. Cl.
*G06F 15/16* (2006.01)
*H04L 29/08* (2006.01)
*H04L 29/06* (2006.01)
*G06F 21/57* (2013.01)
*G06F 17/30* (2006.01)
*G06F 21/62* (2013.01)

(52) U.S. Cl.
CPC ............ *H04L 67/303* (2013.01); *G06F 21/57* (2013.01); *H04L 63/1433* (2013.01); *H04L 67/32* (2013.01); *G06F 17/3089* (2013.01); *G06F 21/62* (2013.01); *H04L 67/02* (2013.01)

(58) Field of Classification Search
USPC ........................................................ 709/245
See application file for complete search history.

*Primary Examiner* — Hee Soo Kim
(74) *Attorney, Agent, or Firm* — Snell & Wilmer, L.L.P.

(57) ABSTRACT

A merchant server may integrate device identifying code into a webpage. In response to a device accessing the webpage, the device identifying code may cause the merchant server to obtain characteristics of the device. A device registry may compare the characteristics of the device with known device profiles to determine a risk level of the device. A transaction account issuer may utilize the risk level in performing an authorization evaluation.

20 Claims, 6 Drawing Sheets

500

Transaction account issuer receives enhanced authorization message — 510

Transaction account issuer stores enhanced authorization message in queue — 520

Transaction account issuer receives authorization request — 530

Transaction account issuer polls device risk queue — 540

Transaction account issuer merges messages — 550

Transaction account issuer performs authorization decision — 560

Transaction account issuer sends authorization response — 570

USING INTEGRATED CODE TO EXTRACT DEVICE CHARACTERISTICS FOR ONLINE SECURITY

FIELD

The present disclosure relates to computer networks, and more specifically, to improving the security of transactions over a computer network.

BACKGROUND

In typical transactions conducted over a network, a consumer may enter transaction account information in a merchant website, and the merchant may transmit an authorization request to a transaction account issuer. The transaction account issuer may evaluate the authorization request and transmit an authorization response to the merchant. However, the available fields in the authorization request are limited, and fraud perpetrators are occasionally able to use stolen information or spoof account information in order to complete fraudulent transactions.

Although additional data exists regarding the transaction which would be beneficial to the evaluation of the authorization request, it can be difficult for merchants and consumers to obtain or transmit the data to the transaction account issuer.

SUMMARY

A system, method, and computer readable medium (collectively, "system") for providing personalized content is disclosed. In various embodiments, the system may perform operations including transmitting device identifying code to a merchant server, wherein the device identifying code causes the merchant server to transmit characteristics of a device and a device ID of the device to a device registry; receiving an authorization request from the merchant server; receiving an enhanced authorization message comprising the device ID from the merchant server; receiving a device risk message comprising the device ID from the device registry; storing the device risk message in a device risk queue; polling the device risk queue based on the device ID in the enhanced authorization message; merging, based on the device ID, the device risk message, the enhanced authorization message, and the authorization request into an enhanced authorization request; authorizing, based on the enhanced authorization request, the authorization request; and transmitting an authorization response to the merchant server.

In various embodiments, the device identifying code may transmit the characteristics of the device in response to a check page being accessed, and generate a random number in response to the checkout page being accessed. The device registry may calculate a device risk score for the device based on a device profile stored in the device registry. The device ID may comprise the characteristics of the device, wherein the merchant server transmits an IP address of the device to the device registry. The characteristics of the device may uniquely identify the device. The system may store the enhanced authorization message in an enhanced authorization queue. The system may poll the enhanced authorization queue in response to the receiving the authorization request. The authorization request may be received via a payment processor, and wherein the enhanced authorization message is received via an application programming interface or the payment processor.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems and methods for improving the security of a transaction over a network are disclosed herein. A transaction account issuer may provide device identification JavaScript code to a merchant. The merchant may integrate the device identifying (ID) JavaScript code into a merchant checkout page. Each time the checkout page is accessed, the device ID JavaScript code may obtain device identifying characteristics of the device accessing the checkout page, including an IP address of the device. The device ID JavaScript code may generate a random ID. The device ID JavaScript code may cause the merchant to transmit the device identifying characteristics to a device registry. The device registry may compare the device identifying characteristics to a database of known devices. The device identifying registry may create a unique permanent ID for the device if the device is not already in the device identifying registry. The device identifying registry may calculate a risk score for the device. The device identifying registry may transmit the risk score, the IP address, and/or the random ID to the transaction account issuer in a device risk message. The transaction account issuer may store the device risk message in a queue.

In response to a consumer submitting a request to initiate a transaction, the merchant may transmit an authorization request to the transaction account issuer. The merchant may also transmit an enhanced authorization message to the transaction account issuer. The enhanced authorization message may include additional information which is not able to be sent via the authorization request. The enhanced authorization message may include the IP address of the device. The transaction account issuer may combine the authorization request, the enhanced authorization message, and the device risk message in order to perform a fraud verification on the authorization request. The transaction account issuer may then return an authorization response to the merchant.

Figure 1:
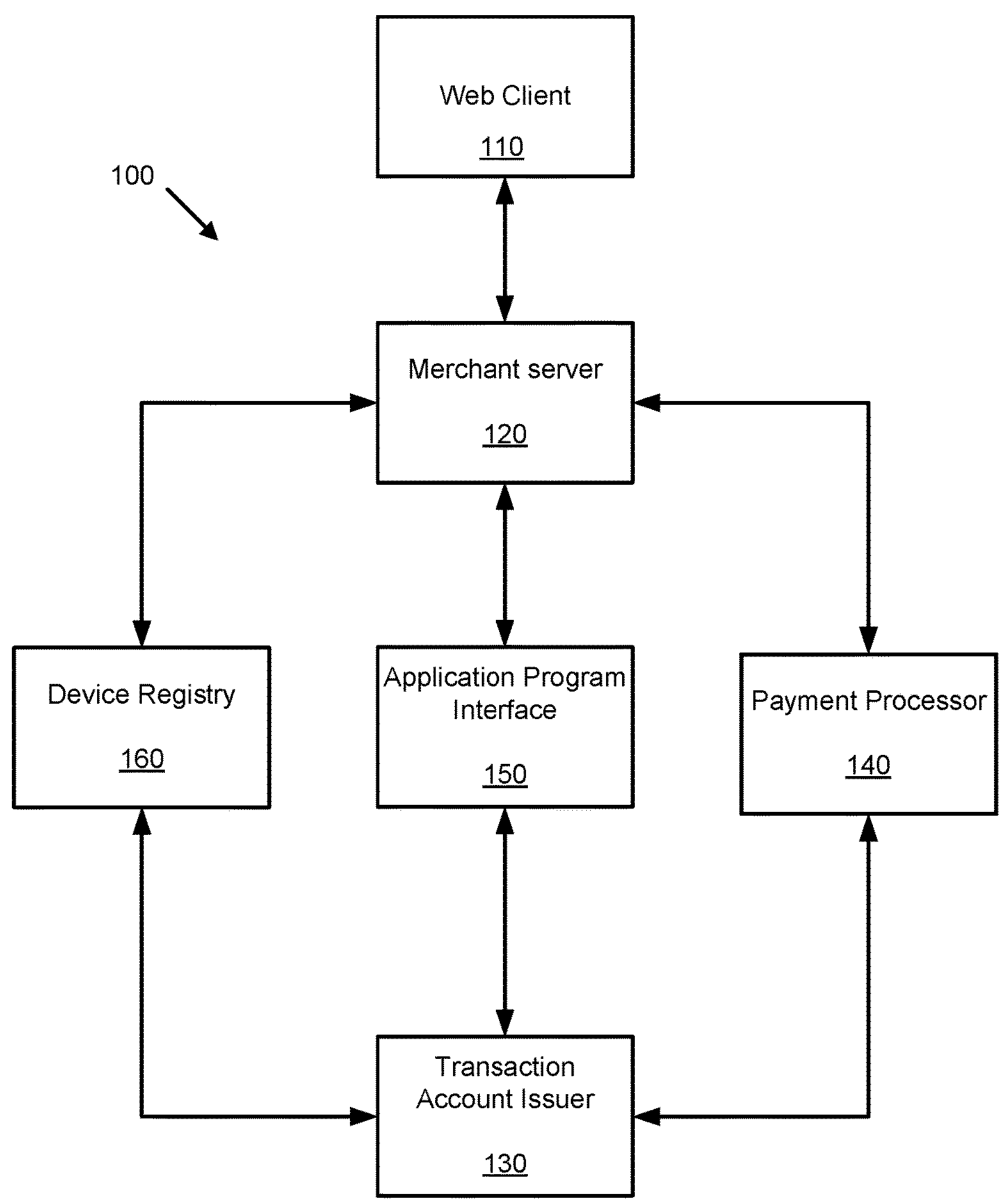
FIG. 1 illustrates various system components of a system for improving the security of online transactions, in accordance with various embodiments.

Referring to FIG. 1, a system for improving the security of an online transaction is illustrated according to various embodiments. The system 100 may comprise a web client 110. A consumer may interact with the system 100 utilizing one or more clients capable of communicating over a network, such as the web client 110. The consumer may use the web client 110 to initiate transactions, view statements, make payments, and otherwise perform transaction account functions. The web client 110 may interact with the merchant server 120 in order for the consumer to interact with a merchant and initiate a transaction. In various embodiments, the web client 110 may comprise a mobile application, and the consumer may open the mobile application to interface with the merchant server 120. In various embodiments, the web client 110 may comprise a touch screen interface, such that consumers may interact with the GUI by contacting the touch screen interface. In various embodiments, the web client 110 may comprise a voice personal assistant ("VPA").

The system 100 may comprise the merchant server 120. The merchant server 120 may be operated by a merchant and provide a mobile application or website on which consumers may purchase goods or services from the merchant. The consumer may initiate a transaction with the merchant, and the merchant server 120 may transmit an authorization request to the transaction account issuer 130. In various embodiments, the authorization request may be transmitted via one or more payment processors 140.

The payment processor 140 may include a company (e.g., a third party) appointed (e.g., by a merchant) to handle transactions for merchant banks. Payment processors may be broken down into two types: front-end and back-end. Front-end processors have connections to various transaction accounts and supply authorization and settlement services to the merchant banks' merchants. Back-end processors accept settlements from front-end processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

The system 100 may comprise an application programming interface ("API") 150. The API 150 may be an interface implemented by a software program which enables the API 150 to interact with other software. The API 150 may include a programming language that enables communication between computer programs, such as programs of a merchant and programs of a financial institution and/or third party fraud prevention provider programs. The API 150 may be implemented by applications, libraries, and operating systems to determine vocabularies and calling conventions, and may be used to access services associated therewith. The API 150 may include specifications for routines, data structures, object classes, and protocols for communication. The API 150 may describe the ways in which a particular task is performed. The API 150 may define a set of request messages, along with a definition of the structure of response messages. The API 150 may be a backward compatible API. In some cases the API 150 may replace the need for and/or supplement middleware.

The API 150 may be used by more than one high-level programming language. Thus, the API 150 may facilitate automatically mapping to features (syntactic or semantic). Data fed to the API 150 may be automatically captured during the processing of a transaction, entered, and/or provided by a database (e.g., a merchant database, financial institution database, and/or third-party database.)

The API 150 may be provided by the transaction account issuer 130. Access to the API 150 may be granted to one or more of the merchant, the financial institution and/or a third party. The API 150 may be provided with or without supporting documentation. The API 150 may allow the merchant server 120 to transmit an enhanced authorization message to the transaction account issuer 130.

The system may comprise a device registry 160. The device registry 160 may maintain a database of device profiles. Each device profile may be associated with a unique permanent ID. The permanent ID may comprise a combination of letters, numbers, or characters which uniquely identifies a device or web client. Each device profile may include many attributes for the device. The device registry 160 may comprise software or hardware for identifying devices, such as INMOBILE or INBROWSER, which are products of InAuth, Inc. In various embodiments, the device registry 160 may be operated by the same entity as the transaction account issuer 130. In various embodiments, the device registry 160 may be operated by a third party. For more information regarding device identification techniques, see U.S. Ser. No. 15/053,362 titled "SYSTEMS AND METHODS FOR RECOGNIZING A DEVICE," and filed on Feb. 25, 2016, the contents of which are incorporated by reference herein in their entirety.

The device registry 160 or the transaction account issuer 130 may transmit device ID JavaScript code to the merchant server 120. The merchant server 120 may integrate the device ID JavaScript code into a checkout page. Each time the checkout page is accessed or refreshed, the device ID JavaScript code may cause the merchant server 120 to collect characteristics of the web client 110. The device ID JavaScript code may cause the merchant server 120 to transmit the characteristics of the web client 110 to the device registry 160. The device ID JavaScript code may generate a device ID. In various embodiments, the device ID JavaScript code may generate a random ID to be used for the device ID. In various embodiments, the device ID JavaScript code may use the IP address of the web client 110 for the device ID.

The device registry 160 may compare the characteristics of the web client 110 to device profiles stored in the device registry 160. If the device registry 160 already has a stored device profile for the web client 110, the device registry may determine if the web client 110 has been previously associated with fraudulent transactions. Additionally, regardless of whether the device registry 160 comprises a stored device profile for the web client 110, the device registry 160 may compare the characteristics of the web client 110 with characteristics of other device profiles that may be similar and determine whether the similar device profiles have been previously associated with fraudulent transactions. For example, the device registry may determine that, based on the IP address of the web client 110, the web client 110 is located in a geographic region where many other device profiles have been previously associated with fraudulent transactions.

The device registry 160 may calculate a fraud risk score for the web client 110. An example of a simple calculation may be starting at zero and adding one point for each fraudulent transaction associated with the device profile of the web client 110, with a higher score indicating a riskier device profile. However, more complex algorithms may be used to calculate the fraud risk score based on the data available to the device registry 160.

The transaction account issuer 130 may include any hardware or software for authorizing transaction requests and/or performing fraud assessment. The transaction account issuer 130 may be operated by a financial institution which issues transaction accounts. However, in various embodiments the transaction account issuer 130 is operated by a third party. The transaction account issuer 130 may be in communication with any database or combination of databases that stores information related to fraud or fraud potential in order to authorize transaction requests.

Figure 2:
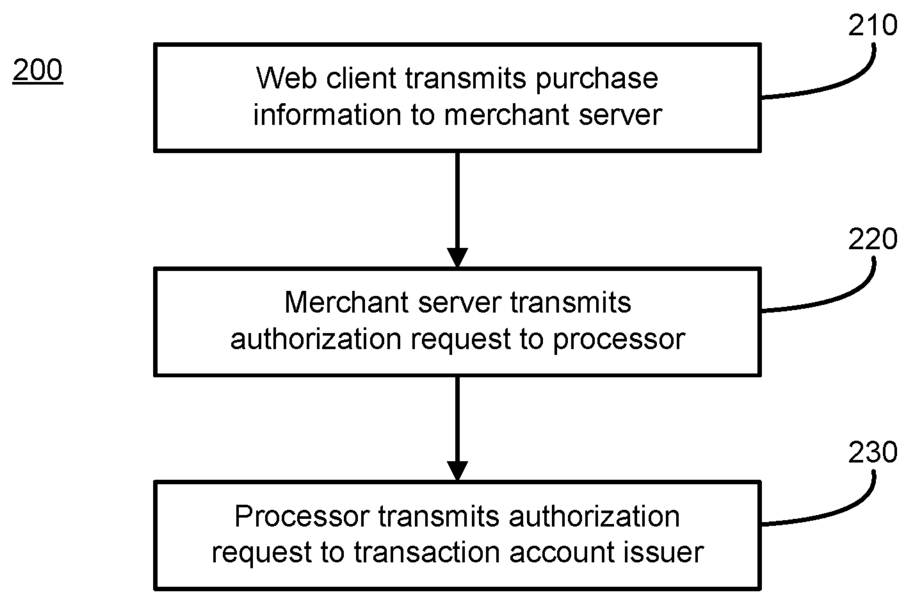
FIG. 2 illustrates a process flow for transmitting an authorization request, in accordance with various embodiments.

Referring to FIG. 2, a process 200 for transmitting an authorization request is illustrated according to various embodiments. A consumer may open a web browser on the web client and access a merchant website. In various embodiments, the website may be cached on a web acceleration server which facilitates communication between the web client and the merchant server. Thus, in various embodiments, while browsing through the merchant website, the web client may not be communicating with the merchant server, but rather communicating with the web acceleration server.

At some point, the consumer may decide to make a purchase of goods or services from the merchant. The consumer may select the items and navigate to a checkout page. The consumer may input purchase information into the website. For example, in various embodiments the purchase information may include a transaction account number, a transaction account issuer, an expiration date, a security code, a billing address, a consumer name, a consumer birth date, a shipping address, a ship-to-name, a shipping method, an email address, a telephone number, and/or a description of the goods or services being purchased. In step 210, the web client may transmit the purchase information to the merchant server.

The merchant server may assemble various elements of the purchase information into an authorization request. In various embodiments, the authorization request may comprise the transaction amount, the transaction account number, the expiration date, and the billing address. In various embodiments, the authorization request may comprise an IP address or device ID of the web client. However, the authorization request may comprise any combination of the purchase information and/or additional information added by the merchant server.

In various embodiments, the authorization request for a transaction may be communicated from the merchant server to the transaction account issuer and/or an authorization system through at least one of a gateway, vendor, or payment processor. In step 220, the merchant server may transmit the authorization request to the payment processor. In step 230, the payment processor may transmit the authorization request to the transaction account issuer. Though not depicted, multiple gateways, vendors, and processors may be utilized in communicating between a merchant server and a transaction account issuer.

Figure 3:
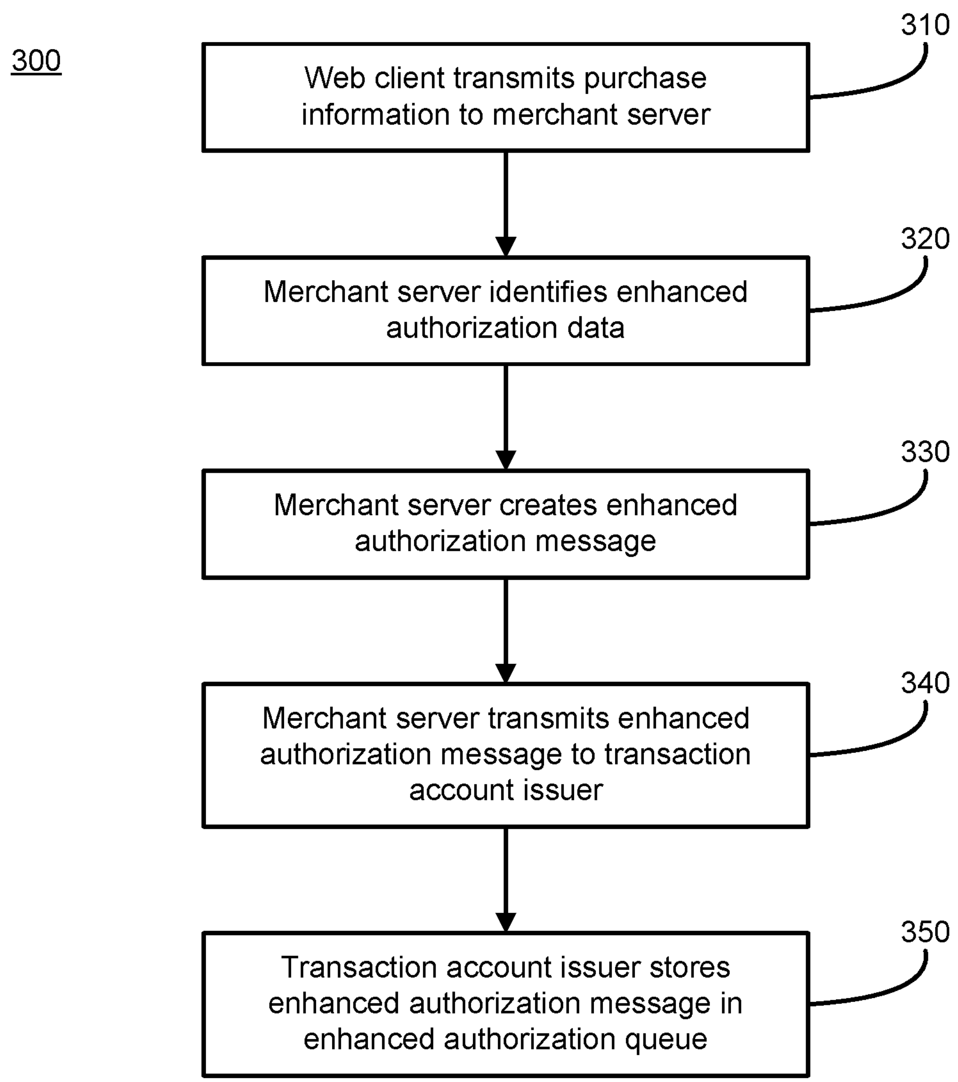
FIG. 3 illustrates a process flow for transmitting an enhanced authorization message, in accordance with various embodiments.

Referring to FIG. 3, a process 300 for transmitting an enhanced authorization message is illustrated, according to various embodiments. In step 310, the web client may transmit the purchase information to the merchant server. In step 320, the merchant server may identify enhanced authorization data. The merchant server may store the data associated with the transaction. The purchase information may be the same purchase information as described with reference to FIG. 2. The enhanced authorization data may comprise any of the purchase information input by the consumer. Additionally, the enhanced authorization data may comprise data captured by the merchant server. For example, the merchant server may capture an IP address of the web client, a device ID of the web client, a time of the purchase request, a merchant identifier number, a customer hostname, HTTP browser type, and/or a description of the goods or services. In various embodiments, a device ID JavaScript code may generate a random ID identifying the device interacting with the merchant server.

In step 330, the merchant server may create an enhanced authorization message. In various embodiments, the merchant server may create the enhanced authorization message in response to the consumer submitting a transaction request. In various embodiments, the transaction account issuer may receive an authorization request from the payment processer, and in response to receiving the authorization request the transaction account issuer may transmit a request to the merchant server for the enhanced authorization message via the API.

The enhanced authorization message may contain some of the same information as the authorization request described with reference to FIG. 2. For example, in various embodiments the enhanced authorization message may comprise the transaction account number, the expiration date, and the billing address. However, the enhanced authorization message may comprise additional data which was not contained in the authorization request. For example, in various embodiments the enhanced authorization message may comprise any combination of the purchase information and the enhanced authorization data identified by the merchant server. The merchant may define up front additional information may be passed in the fields of the enhanced authorization message. In various embodiments, the enhanced authorization message may include the device ID, which may be the IP address of the device and/or the random ID generated by the device ID JavaScript code. In various embodiments, the enhanced authorization message may include an IP address field, and the merchant may additionally input data into a DeviceID field or leave the DeviceID field blank.

In step 340, the merchant server may transmit the enhanced authorization message to the transaction account issuer. In various embodiments, the enhanced authorization message bypasses one or all of the payment processor, any gateways or vendors. Thus, the payment processor may not ever need to process or be aware of the enhanced authorization message. In various embodiments, the enhanced authorization message is transmitted to the transaction account issuer through an API.

In step 350, the transaction account issuer may receive the enhanced authorization message. In various embodiments the transaction account issuer may match the enhanced authorization message with a corresponding authorization request. In various embodiments, the transaction account issuer may first receive the authorization request, then the transaction account issuer may request the enhanced authorization data from the merchant server and match the enhanced authorization data with the authorization request. In various embodiments, the transaction account issuer may store the enhanced authorization message in an enhanced authorization queue, and after the transaction account issuer receives the authorization request, the transaction account issuer may query the enhanced authorization queue for an enhanced authorization message corresponding to the authorization request.

Figure 4:
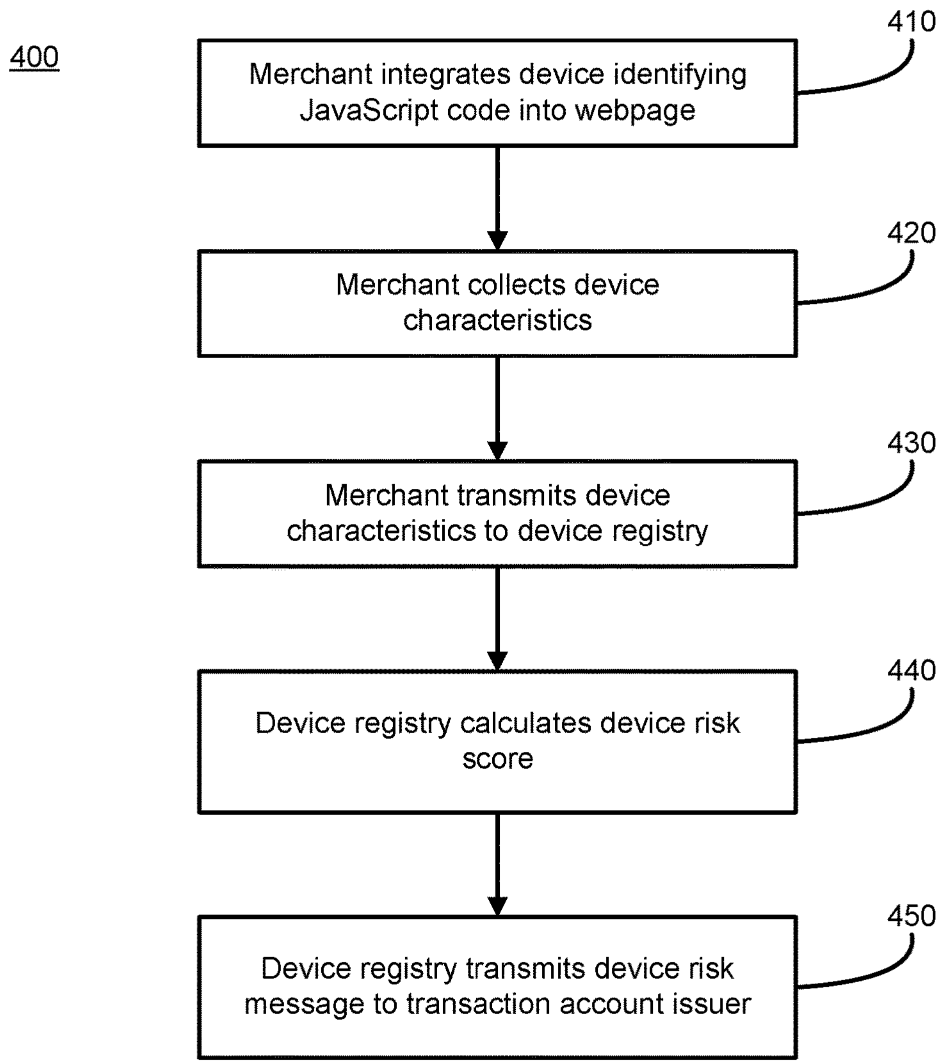
FIG. 4 illustrates a process flow for transmitting a device risk message, in accordance with various embodiments.

Referring to FIG. 4, a process 400 for transmitting a device risk message is illustrated according to various embodiments. In step 410, a merchant may integrate a device ID JavaScript code into a webpage, such as a checkout page. In various embodiments, the transaction account issuer or the device registry may transmit the device ID JavaScript code to the merchant server. In response to a consumer accessing the webpage, the device ID JavaScript code may execute. In step 420, the device ID JavaScript code may collect characteristics of the device interacting with the merchant server. The characteristics may include the IP address of the device. In various embodiments, the device ID JavaScript code may generate a device ID. In step 430, the merchant server may transmit the characteristics, the IP address of the device, and/or the device ID to a device registry.

The characteristics of the web client may uniquely identify the particular web client. The device registry may evaluate the characteristics and determine whether the device registry has a previously stored device profile for the web client. If the device registry has a device profile for the web client, the device registry may determine whether the web client has been associated with any previous fraudulent transactions. If the device registry does not contain a device profile for the web client, the device registry may create a device profile for the web client and generate a unique permanent ID for the web client. In various embodiments, the device registry may use the device ID received from the merchant server as the permanent ID for the web client.

In step 440, the device registry may compare the characteristics of the web client with other device profiles to determine a device risk score for the web client. In various embodiments, the device registry may compare certain characteristics of the web client with other characteristics of the web client. For example, the device registry may determine that the IP address of the web client indicates that the web client is located at the same or nearby location of a billing address associated with the web client. This may indicate that there is a low fraud risk associated with the web client. In contrast, the device registry may determine that the IP address of the web client indicates that the web client is located in a different country than a billing address associated with the web client, which may indicate a higher fraud risk. In various embodiments, the device registry may evaluate the time zone of the device, the language being used, addresses, email addresses, etc. and identify inconsistencies which may indicate a higher likelihood of fraud. The device registry may also be used to determine when the last time the web client was seen by the device registry, how many times the web client has been seen by the device register, how many transaction accounts the web client has been associated with, etc.

In step 450, the device registry may transmit the device ID and the device risk score to the transaction account issuer in a device risk message. The device registry or the transaction account issuer may store the device risk message in a queue. In various embodiments, the queue may remove the device risk messages from the queue after a prescribed time limit, such as after fifteen minutes. The transaction account issuer may utilize the device risk score in making a determination as to whether to approve an authorization request.

Figure 5:
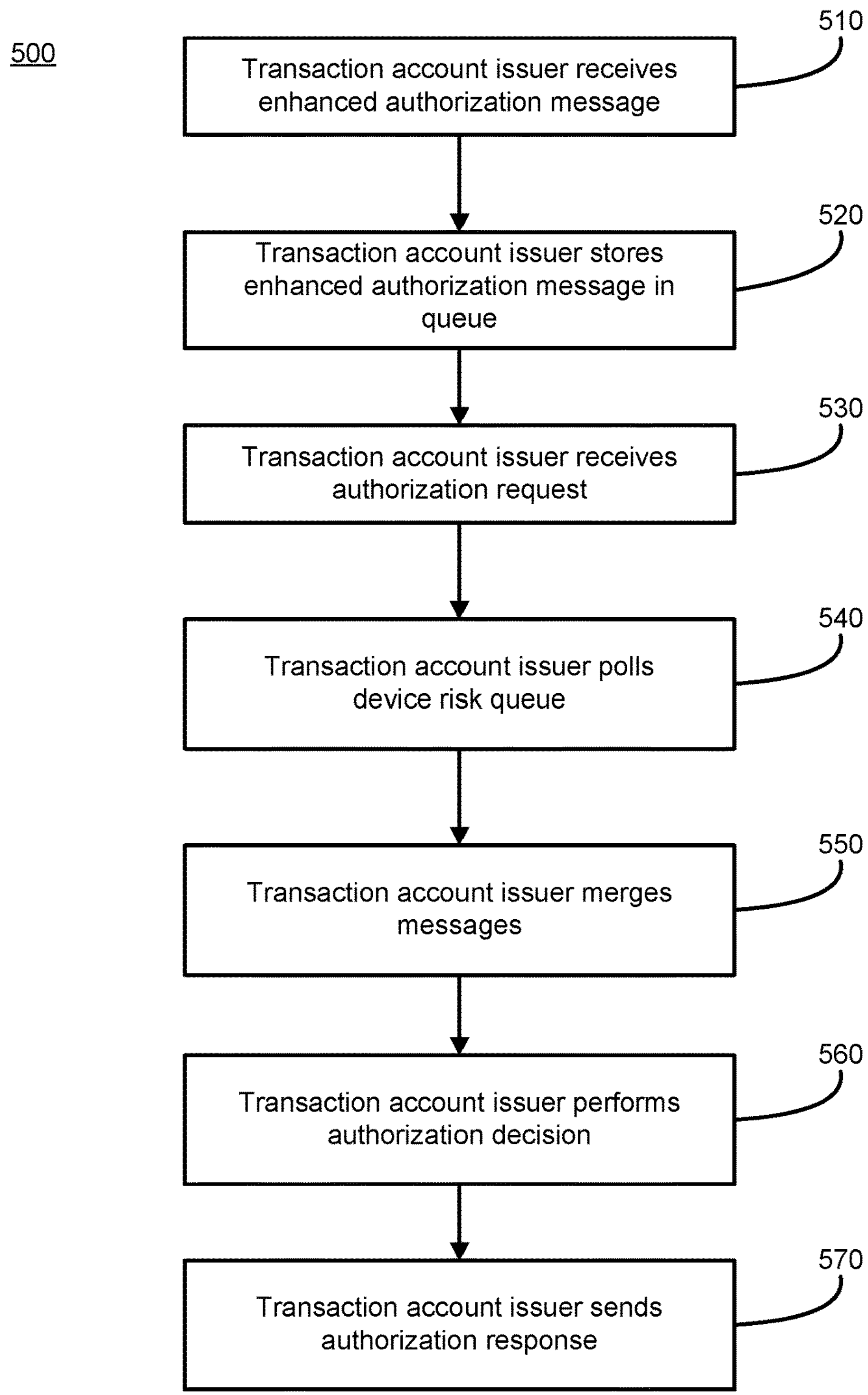
FIG. 5 illustrates a process flow for performing risk assessment, in accordance with various embodiments.

Referring to FIG. 5, a process for performing risk assessment is illustrated according to various embodiments. In step 510, the transaction account issuer may receive an enhanced authorization message. In step 520, the transaction account issuer may store the enhanced authorization message in an enhanced authorization queue.

In step 530, the transaction account issuer may receive an authorization request. The transaction account issuer may determine that a merchant associated with the authorization request utilizes enhanced authorization messages and/or device risk scores. The transaction account issuer may poll the enhanced authorization queue in order to match an enhanced authorization message with a corresponding authorization request. In the event that the transaction account issuer does not locate a corresponding enhanced authorization message in the enhanced authorization queue, the transaction account issuer may request an enhanced authorization message from the merchant server, or the transaction account issuer may proceed to perform an authorization decision based on the information contained in the authorization request.

In various embodiments, the transaction account issuer locates an enhanced authorization message in the enhanced authorization queue corresponding to the authorization request. In step 540, the transaction account issuer identifies a device ID in the enhanced authorization message, and the transaction account issuer polls a device risk queue for device risk messages containing the device ID.

In step 550, the transaction account issuer may merge the authorization request, the enhanced authorization message, and the device risk message in order to create an enhanced authorization request. In various embodiments, the authorization request, the enhanced authorization message, and the device risk message may be combined simultaneously. However, in various embodiments, the enhanced authorization message may be first merged with the authorization request and subsequently merged with the device risk message, or the enhanced authorization message may be first merged with the device risk message and subsequently matched with the authorization request.

In step 560, the transaction account issuer may perform an authorization decision. In various embodiments, the transaction account issuer may compare the data in the enhanced authorization message with data in one or more databases. For example, the data in databases may indicate that the IP address associated with the enhanced authorization message has been used to commit fraud in the past. In various embodiments, the database may contain data associated with any of the information in the enhanced authorization message indicating positive or negative fraud risks associated with the transaction. The transaction account issuer may use the information in the databases as well as the device risk score in determining whether to approve or decline the authorization request.

In step 570, the transaction account issuer may transmit an authorization response indicating an approval or denial of the authorization request. In various embodiments the authorization response is transmitted to the merchant server through the payment processor. In various embodiments the authorization response is transmitted to the merchant server through the API.

Figure 6:
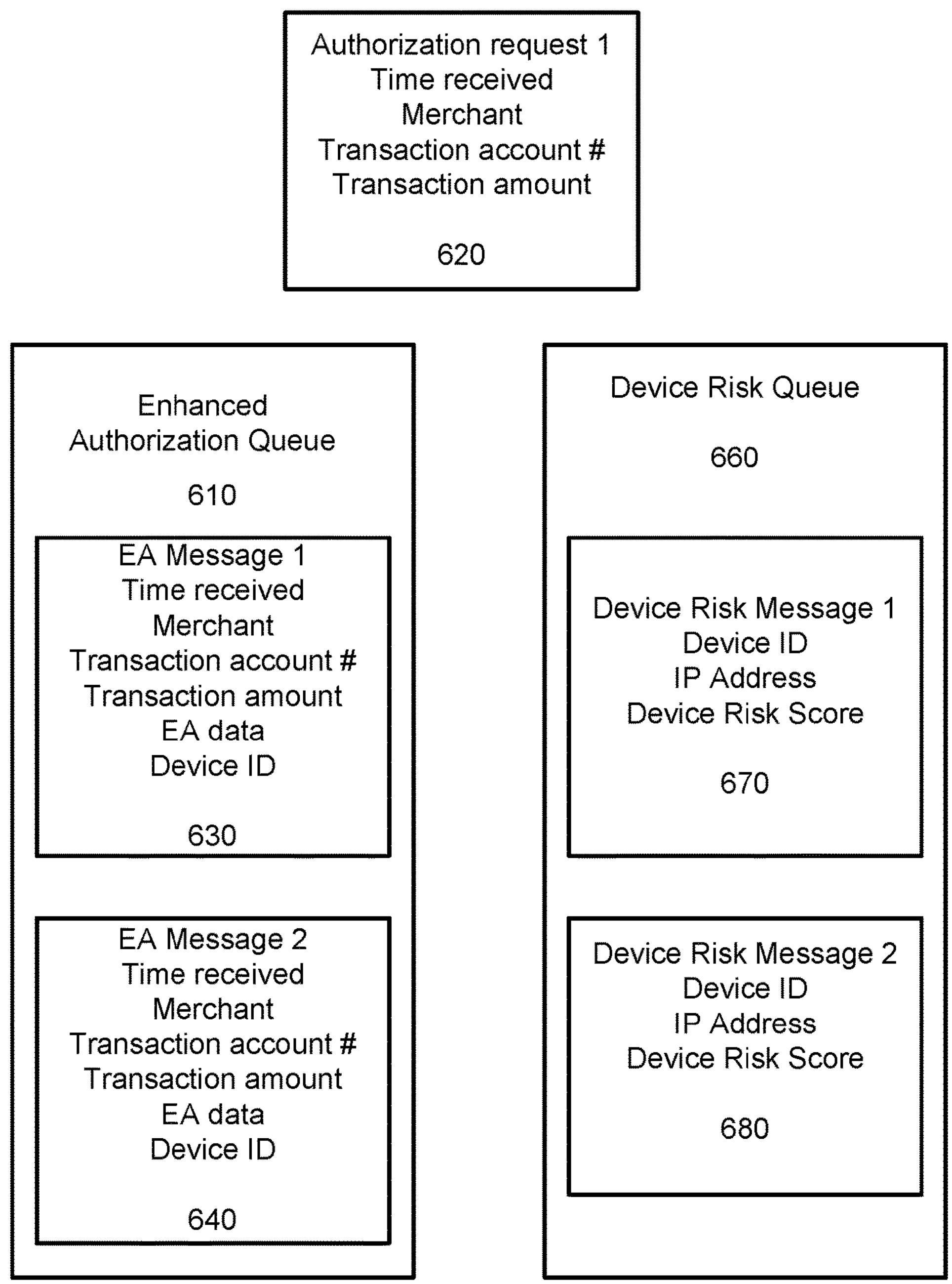
FIG. 6 illustrates an example of matching an authorization request to an enhanced authorization message and a device risk message, in accordance with various embodiments.

Referring to FIG. 6, an example of matching an authorization request to an enhanced authorization message and a device risk message is illustrated according to various embodiments. The transaction account issuer may poll the enhanced authorization queue 610 for an enhanced authorization message corresponding to the authorization request 620. In various embodiments the transaction account issuer may compare fields such as time received, a merchant associated with the message, a transaction account number, or a transaction amount of the authorization request with similar fields of an enhanced authorization message in the enhanced authorization queue 610. In various embodiments, the transaction account issuer may compare any data associated with the authorization request with data in the enhanced authorization messages. For example, the transaction account issuer may determine that the time received of the authorization request 620 is not within a specified amount of the time received of enhanced authorization message 630 and determine that the enhanced authorization message 630 does not correspond to authorization request 620. In various embodiments, the transaction account issuer may determine that the data associated with authorization request 620 is sufficiently similar to the data associated with enhanced authorization message 640 and determine that the authorization request 620 and the enhanced authorization message 640 correspond to the same transaction.

The transaction account issuer may poll the device risk queue 660 for a device risk message having the same device ID or IP address as the enhanced authorization message 640. In the event that the device risk queue 660 contains more than one device risk message for the device ID, the transaction account issuer may select the most relevant device risk message. For example, the transaction account issuer may determine that the device risk message 670 was received closer in time to the enhanced authorization message 640 than the device risk message 680, and the transaction account issuer may select the device risk message 670.

In various embodiments, the transaction account issuer merges the data of the authorization request 620, the enhanced authorization message 640, and the device risk message 670 to create an enhanced authorization message.

The transaction account issuer may use the enhanced authorization message to determine whether to approve or deny the authorization request. In various embodiments, the transaction account issuer may remove the enhanced data prior to transmitting an authorization response to the merchant server.

The authorization request or the enhanced authorization message may include a request for fraud services. The terms and phase "a request for fraud services" may be a traditional request. A request for services may also describe sending additional information captured during a transaction which software, hardware, third party, and/or transaction account issuer may use in association with a fraud assessment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with," "identify" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The customer may be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors. The merchant may make API calls to retrieve available context for customers of interest.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as user devices discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID") used to identify a device and/or user in the context of BLE. The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® Applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

In various embodiments, the system and method may include alerting a merchant when a user device is on site. The system may include generating customized information and alerting a merchant that the information can be accessed from a merchant device. The alerts are generated by detecting a user presence at a merchant location and building information alerts and formatting the alerts based upon merchant preference information. The alerts may be transmitted to a merchant device which, when connected to the computer, causes the computer to auto-launch an application to display contextual services to the user. More particularly, the method may comprise providing a viewer application to a user for installation on the remote user device; receiving contextual services at the user device sent from a data source over the Internet, the transmission server comprising a microprocessor and a memory that stores the user's preferences for contextual services, destination address, specified information, wherein the microprocessor filters the received information by comparing requests for contextual services to user permissions; generates contextual service message; and transmits the contextual service message over a wireless communication channel to a user device associated with the user based upon the destination address and transmission schedule, wherein the alert activates the application to cause the contextual services to display on the user device.

In various embodiments, the system may also address the problem of retaining control over customers during affiliate purchase transactions, using a system for co-marketing the "look and feel" of the context services interfaces with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information.

The server constructs a composite web page using the retrieved "look and feel" information of the host web page, with the product-related content embedded within it, so that the composite web page is visually perceived by the customer as associated with the host web page. The server then transmits and presents this composite web page to the customer so that they effectively remain on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers.

More particularly, the system may be useful in an outsource provider serving web pages offering contextual services. The computer store containing data, for each of a plurality of merchant web pages and contexts, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page and/or contextual services; and using the data retrieved, automatically generate and transmit to the web browser a second web page that displays: information associated with the commerce object associated with the link that has been activated, and the plurality of visually perceptible elements visually corresponding to the source page and/or contextual services.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:

transmitting, by a computer-based system, device identifying code to a merchant server, wherein the device identifying code causes the merchant server to transmit characteristics of a device and a device ID of the device to a device registry;

receiving, by the computer-based system, an authorization request from the merchant server;

receiving, by the computer-based system, an enhanced authorization message comprising the device ID from the merchant server;

receiving, by the computer-based system, a device risk message comprising the device ID from the device registry;

storing, by the computer-based system, the device risk message in a device risk queue;

polling, by the computer-based system, the device risk queue based on the device ID in the enhanced authorization message;

merging, by the computer-based system and based on the device ID, the device risk message, the enhanced authorization message, and the authorization request into an enhanced authorization request;

authorizing, by the computer-based system and based on the enhanced authorization request, the authorization request; and transmitting, by the computer-based system, an authorization response to the merchant server.

2. The method of claim 1, wherein the device identifying code transmits the characteristics of the device in response to a check page being accessed, and wherein the device identifying code generates a random number in response to the checkout page being accessed.

3. The method of claim 1, wherein the device registry calculates a device risk score for the device based on a device profile stored in the device registry.

4. The method of claim 1, wherein the device ID comprises the characteristics of the device, wherein the merchant server transmits an IP address of the device to the device registry.

5. The method of claim 1, wherein the characteristics of the device uniquely identify the device.

6. The method of claim 1, further comprising:

storing, by the computer-based system, the enhanced authorization message in an enhanced authorization queue; and polling, by the computer-based system, the enhanced authorization queue in response to the receiving the authorization request.

7. The method of claim 1, wherein the authorization request is received via a payment processor, and wherein the enhanced authorization message is received via an application programming interface or the payment processor.

8. A computer-based system, comprising:

a processor;

a tangible, non-transitory memory configured to communicate with the processor, the tangible, non-transitory memory having instructions stored thereon that, in response to execution by the processor, cause the processor to perform operations comprising:

transmitting, by the processor, device identifying code to a merchant server, wherein the device identifying code causes the merchant server to transmit characteristics of a device and a device ID of the device to a device registry;

receiving, by the processor, an authorization request from the merchant server;

receiving, by the processor, an enhanced authorization message comprising the device ID from the merchant server;

receiving, by the processor, a device risk message comprising the device ID from the device registry;

storing, by the processor, the device risk message in a device risk queue;

polling, by the processor, the device risk queue based on the device ID in the enhanced authorization message;

merging, by the processor and based on the device ID, the device risk message, the enhanced authorization message, and the authorization request into an enhanced authorization request;

authorizing, by the processor and based on the enhanced authorization request, the authorization request; and transmitting, by the processor, an authorization response to the merchant server.

9. The system of claim 8, wherein the device identifying code transmits the characteristics of the device in response to a check page being accessed, and wherein the device identifying code generates a random number in response to the checkout page being accessed.

10. The system of claim 8, wherein the device registry calculates a device risk score for the device based on a device profile stored in the device registry.

11. The system of claim 8, wherein the device ID comprises the characteristics of the device, wherein the merchant server transmits an IP address of the device to the device registry.

12. The system of claim 8, wherein the characteristics of the device uniquely identify the device.

13. The system of claim 8, wherein the operations further comprise:

storing, by the processor, the enhanced authorization message in an enhanced authorization queue; and polling, by the processor, the enhanced authorization queue in response to the receiving the authorization request.

14. The method of claim 1, wherein the authorization request is received via a payment processor, and wherein the enhanced authorization message is received via an application programming interface or the payment processor.

15. An article of manufacture including a non-transitory, tangible computer readable storage medium having instructions stored thereon that, in response to execution by a computer-based system, cause the computer-based system to perform operations comprising:

transmitting, by the computer-based system, device identifying code to a merchant server, wherein the device identifying code causes the merchant server to transmit characteristics of a device and a device ID of the device to a device registry;

receiving, by the computer-based system, an authorization request from the merchant server;

receiving, by the computer-based system, an enhanced authorization message comprising the device ID from the merchant server;

receiving, by the computer-based system, a device risk message comprising the device ID from the device registry;

storing, by the computer-based system, the device risk message in a device risk queue;

polling, by the computer-based system, the device risk queue based on the device ID in the enhanced authorization message;

merging, by the computer-based system and based on the device ID, the device risk message, the enhanced authorization message, and the authorization request into an enhanced authorization request;

authorizing, by the computer-based system and based on the enhanced authorization request, the authorization request; and transmitting, by the computer-based system, an authorization response to the merchant server.

16. The article of manufacture of claim 15, wherein the device identifying code transmits the characteristics of the device in response to a check page being accessed, and wherein the device identifying code generates a random number in response to the checkout page being accessed.

17. The article of manufacture of claim 15, wherein the device registry calculates a device risk score for the device based on a device profile stored in the device registry.

18. The article of manufacture of claim 15, wherein the device ID comprises the characteristics of the device, wherein the merchant server transmits an IP address of the device to the device registry.

19. The article of manufacture of claim 15, wherein the characteristics of the device uniquely identify the device.

20. The article of manufacture of claim 15, wherein the operations further comprise:

storing, by the computer-based system, the enhanced authorization message in an enhanced authorization queue; and polling, by the computer-based system, the enhanced authorization queue in response to the receiving the authorization request.

* * * * *